May 30, 1933.  S. C. PATTIN  1,911,923
PLANTER
Filed Aug. 8, 1928   2 Sheets-Sheet 2
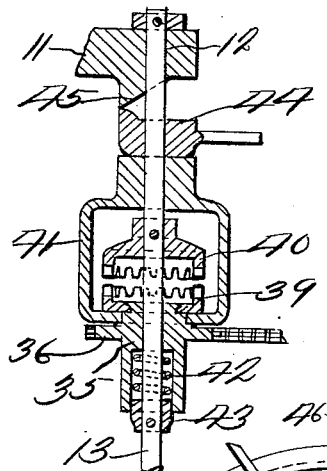
Fig. 4.
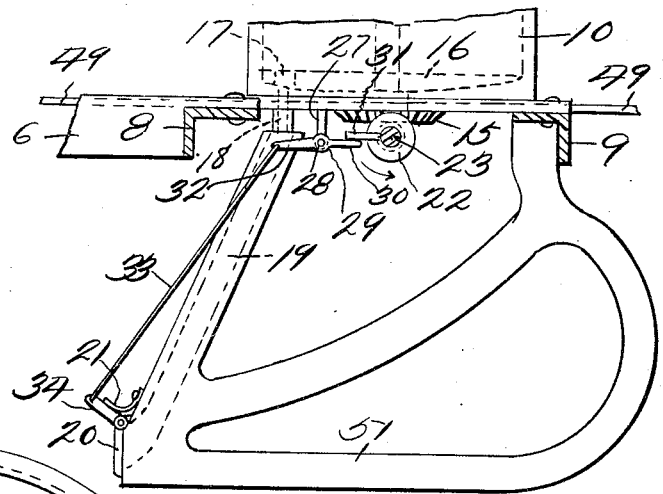
Fig. 3.
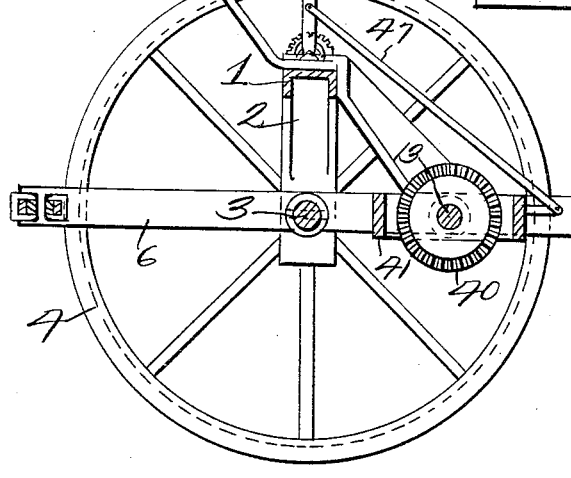
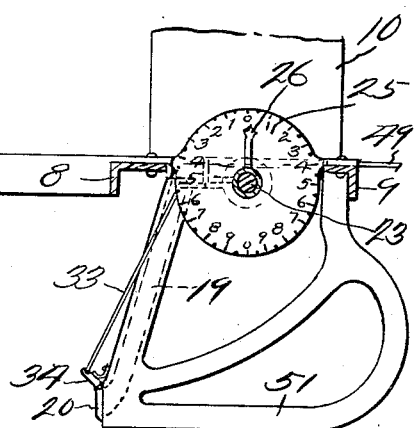
Fig. 2.
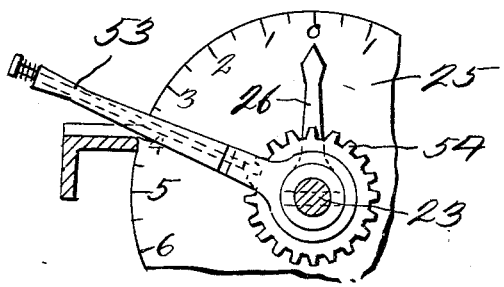
Fig. 5.
Inventor
Schuyler C. Pattin
By Philip A. Ferrell
Attorney Patented May 30, 1933

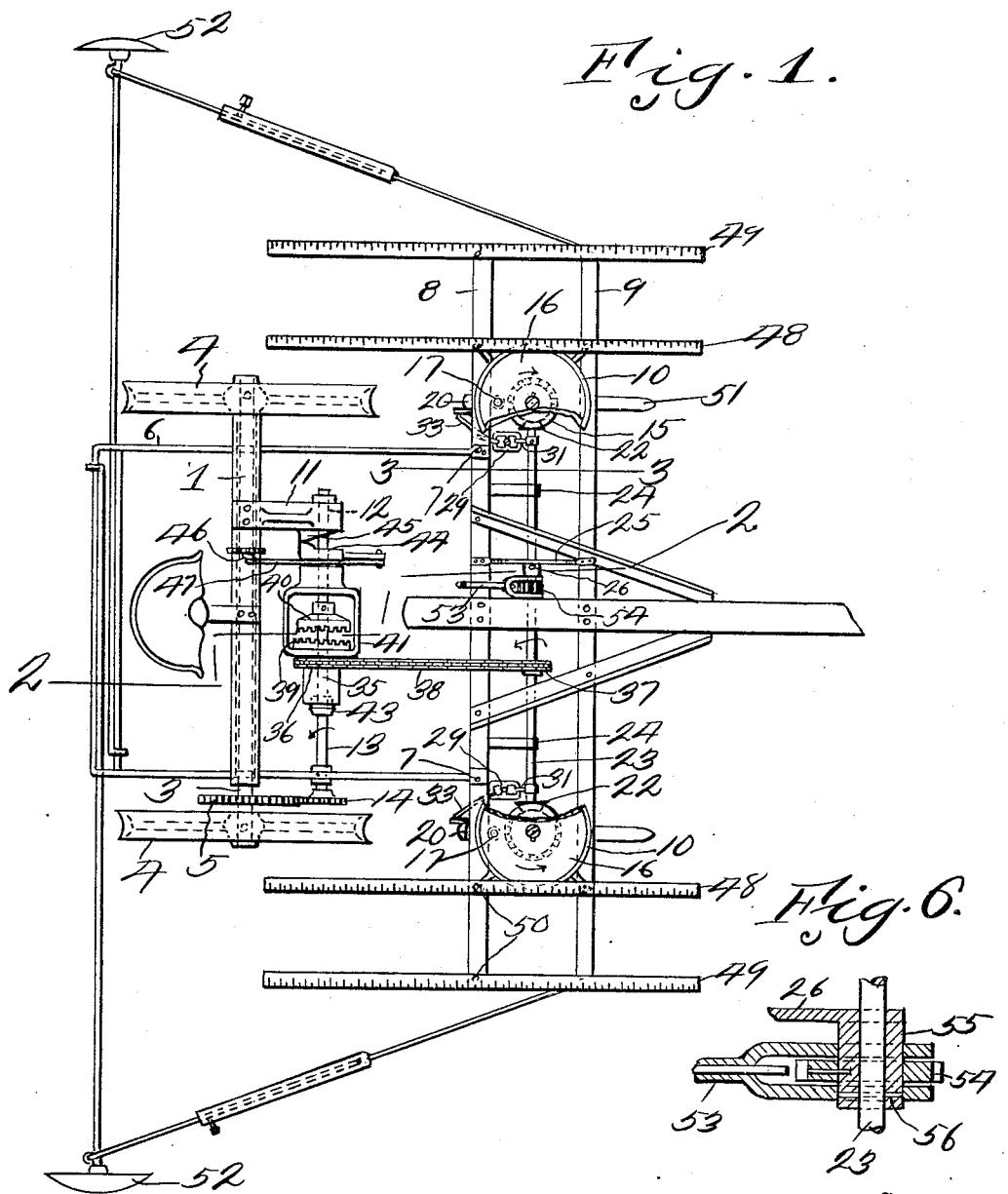

1,911,923

UNITED STATES PATENT OFFICE

SCHUYLER C. PATTIN, OF TRILLA, ILLINOIS

PLANTER

Application filed August 8, 1928. Serial No. 298,271.

The invention relates to planters, and has for its object to provide a device of this character of the two row type by means of which rows may be accurately formed in parallel relation and successive rows with their hill in longitudinal and transverse alinement and equally spaced apart without the use of check wires and complicated mechanism.

A further object is to provide shaft and gear connections between the dropper mechanisms of the boxes, a driving connection between the shaft connection and the planter ground engaging wheel and dial means whereby the dropper mechanisms of the boxes may be accurately positioned at the starting of rows. Also to provide clutch means whereby the ground engaging wheel driving mechanism may be rendered inoperative during the dial setting operation.

A further object is to provide the transverse hopper control shaft with an arm rotatable therewith in the path of one end of a pivoted lever, which pivoted lever is beneath each box and has a connecting rod connecting with a pivoted closure at the discharge end of the runner, whereby grain will be discharged from the runner at a predetermined position according to the position of the dial pointer.

A further object is to provide the hopper shaft with a gear carried by the sleeve of the dial pointer, which sleeve is rigidly mounted on the shaft and lever means cooperating with the gear whereby the pointer may be moved to various positions in relation to the scale of the stationary dial for positioning the hopper dropper mechanism at predetermined positions.

A further object is to provide spaced parallel rules longitudinally disposed at opposite sides of the machine with registering scale markings across which a rod may be placed for marking the ground at the end of rows for accurately positioning a mark for the starting of successive rows, also to place the inner rules on a higher plane than the outer ones whereby the rod will incline downwardly when placed across the rules for insuring a marking at a right angle to the longitudinal center of the machine.

A further object is to provide the rear end of the frame with transverse extension rods having markers or guides at their outer ends, which may be adjusted and held in various positions in relation to the planter boxes according to the distance desired between the rows of plants.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of the planter.

Figure 2 is a vertical longitudinal sectional view through the planter taken on line 2—2 of Figure 1.

Figure 3 is a vertical longitudinal sectional view taken on line 3—3 of Figure 1.

Figure 4 is a horizontal sectional view through the clutch mechanism.

Figure 5 is an enlarged side elevation of the pointer control lever and a portion of the dial.

Figure 6 is a detail cross-sectional view of the shaft adjusting means.

Referring to the drawings, the numeral 1 designates a conventional form of arch in the downwardly extending arms 2 of which is rotatably mounted an axle 3, to the outer ends of which are secured ground engaging wheels 4, which wheels as they roll over the ground rotate the axle 3 and the drive gear 5 carried thereby. Disposed below the arch 1 is a frame 6, the arms of which form bearings for the axle 3 and extend forwardly and are anchored at 7 to the transversely disposed bar 8 at the forward end of the machine. The bar 8 and the bar 9 form a frame and support thereon conventional forms of planter hoppers 10.

Extending forwardly and downwardly from the arch 1 is a bracket 11, which forms a supporting bearing 12 for the countershaft 13. The other end of the countershaft is rotatably mounted in one of the arms of the U-shaped frame 6 and is provided with a gear 14 which meshes with a gear 15 adjacent one of the ground engaging wheels, and it will be seen that as the shaft 3 rotates the countershaft 13 will also rotate. The discharge mechanism of the hoppers 10 are controlled and operated by gears 15 beneath the hopper, and which gears when rotated rotate the plates 16 within the hoppers for placing the discharge apertures 17 in registration with the discharge ports 18 at predetermined distances or periods for properly spacing hills. As the grain is discharged from the spouts 18 it moves downwardly by gravity through the chutes 19 to the lower end thereof and where it is held against final discharge by the pivoted closures 20, which are normally maintained closed by springs 21. Bevelled gears 15 are rotated simultaneously by the bevelled gears 22 carried by the shaft 23, which shaft is supported between the bars 8 and 9 by means of brackets 24. The shaft 23 extends through a stationary dial 25 and is provided with a pointer 26 which rotates therewith and is adapted to be moved into registration with any of the graduations of the stationary dial 25. For instance, when the pointer 26 is in registration with the zero mark of the dial as shown in Figure 2, the discharge ports 17 and 18 are in registration, and at the starting of a row, the dial is so set, and as the machine advances over the ground, hills are formed at equal distances apart, for instance forty inches.

Extending downwardly from the under sides of the hoppers 10 are brackets 27 on the lower ends of which are pivotally connected at 28 rock levers 29. The forward ends of the levers indicated by the numeral 30 are in loop form and in the path of the arms 31 carried by the shaft 23. It will be seen that as the shaft 23 rotates, the arms 31 will force the loop members 30 downwardly, thereby raising the rear loop members 32 and imparting upward pulls on the connecting rods 33, which are connected to the arms 34 of the closures 20, thereby opening the closures at a predetermined position for insuring a discharge of corn or other grain at predetermined positions in a row. It will be noted the opening operation of the closures 20 is substantially at the time of registration of the discharge ports 17 and 18.

Rotatably mounted on the constantly driven countershaft 13 is a sleeve 35 having formed integral therewith a sprocket 36 and extending over said sprocket 36 and a sprocket 37 carried by the shaft 23 is a sprocket chain 38 for imparting rotation to the shaft 23 as desired. The inner end of the sleeve 35 is provided with a clutch element 39, which clutch element is normally held out of engagement with a clutch element 40 rigidly secured on the shaft 13 by means of a yoke 41, which arches the clutch element 40 and is slidably mounted on the shaft 13. The sleeve 35 and clutch element 41 are normally forced towards the clutch element 40 by coiled springs 42 within the sleeve 35, interposed between the sleeve and the collar 43 on the shaft 13. The clutch elements 40 and 39 are maintained in declutched relation by rotatable cam 44, mounted on the shaft 13, and which cam cooperates with a cam surface 45 on the bracket 11, therefore it will be seen that when the cam 14 is rocked by the lever 46 and rod 47, the clutch elements may be controlled.

At the end of a row after the formation of the last hill, the machine has to be turned around to start the next row. However before the starting of the turning operation a rod is placed across the rules 48 and 49 in registration with corresponding graduations, for instance the zero graduations shown at 50 on the rules for making a mark on the ground at a right angle to the row just formed and at a desired distance, whereby upon turning the machine, the shoes 51 may be accurately positioned for starting the next row. During this operation one of the adjustable markers 52 is placed above the row previously formed for insuring the accurate positioning of rows in relation to each other. The markers 52 are also adapted to be placed in alinement with the end of a straight edge when placed across the rules 48 and 49, that is the straight edge ends and markers would be in longitudinal alinement parallel to the longitudinal axis of the planter, and the marks could be adjusted inwardly and outwardly for marking succeeding rows during the planting of previously marked rows. Upon the turning of the machine at the ends of the row and positioning of the runners above the mark previously made by the rod, the clutch elements 40 and 39 are moved to declutch position, and at which time the operator grasps the lever 53 and rotates the gear 54, which gear is mounted on the sleeve 55 which carries the pointer 26, and as the sleeve is pinned to the shaft 23 at 56, it will be seen that the pointer 26 may be moved to zero position as shown in Figure 2 for properly positioning the discharge ports 17 and 18 and the pins 31 for the tripping mechanism for the starting of a new row. This is necessary as it is obvious that during the turning operation, the disc 16 and the tripping mechanism would not be in proper position for starting the row and forming hills. After the positioning of the pointer the clutch elements 40 and 39 are moved into clutch relation, consequently the machine as it passes over the ground will form hills at predetermined distances from each other, usually about forty inches, however this will be varied as desired.

The rules 48 which are the inner ones, are supported adjacent the upper ends of the hoppers 10, while the rules 49 are supported adjacent the lower ends of the hopper but outwardly from the rules 48, whereby when a rod is placed over aligned graduations of the rules 48 and 49, a mark or lines may be formed on the ground as the rod will incline downwardly and outwardly.

From the above it will be seen that a planter is provided whereby rows and plants may be properly positioned and hills accurately alined longitudinally and transversely of a field at predetermined distances from each other. It will also be seen that the mechanism after the turning operation may be easily adjusted for properly forming hills for starting rows. It will also be seen that check wires and the like are eliminated and all of the mechanism is supported out of engagement with the ground thereby insuring positive operation and accurate positioning of the hills.

The invention having been set forth what is claimed as new and useful is:—

1. The combination with a corn planter, of spaced pairs of longitudinally disposed parallel rules mounted on said planter and having similar and registering indicia, each pair of rules comprising inner and outer rules the inner rules being upwardly spaced and forming means whereby a straight edge may be placed on the rules in transverse position whereby it will incline downwardly and outwardly in relation to said planter.

2. The combination with a corn planter, of spaced longitudinally disposed parallel rules having similar and registering indicia, said spaced rules comprising inner and outer rules, the inner rules being upwardly spaced and forming means whereby a straight edge may be placed on the rules in transverse position, whereby it will incline downwardly and outwardly in relation to said planter and inwardly and outwardly adjustable ground markers carried by said planter and to the outside of the rules and adapted to be placed in alinement with the end of the straight edge across the rules.

3. The combination with a corn planter, of spaced longitudinally disposed parallel rules carried by said planter and having similar and registering indicia, said rules comprising inner and outer rules, the inner rule being upwardly spaced in relation to the outer rule and forming means whereby a straight edge may be placed on the rules in transverse position, whereby it will incline downwardly and outwardly in relation to the side of the planter.

In testimony whereof I hereunto affix my signature.

SCHUYLER C. PATTIN.